June 1, 1943.    B. SHMURAK    2,320,390
CAN TESTING DEVICE
Filed Jan. 18, 1941
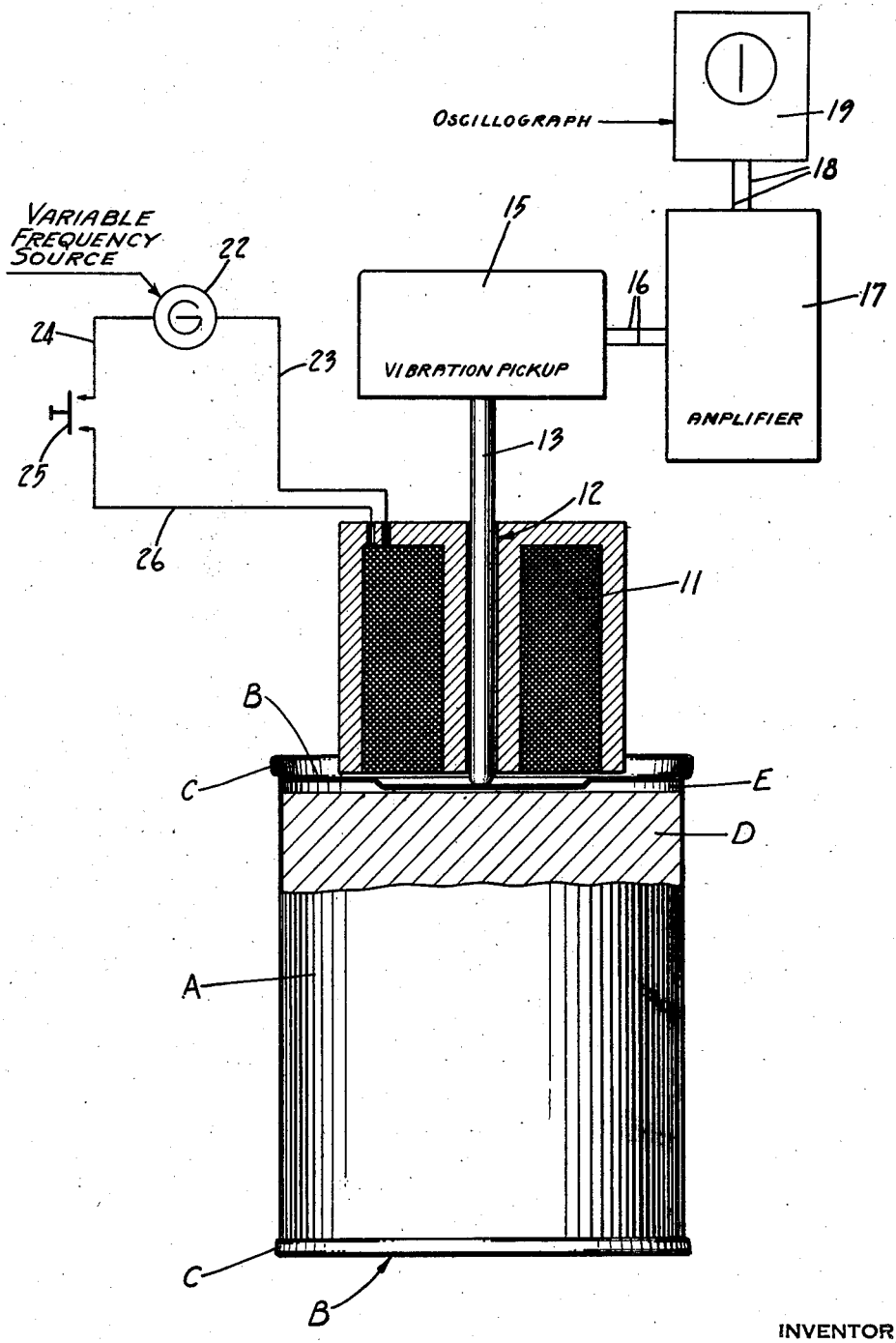
INVENTOR
Benjamin Shmurak
BY Ivan D. Thornburgh
Chas. H. Erne
ATTORNEYS Patented June 1, 1943

2,320,390

UNITED STATES PATENT OFFICE 2,320,390

CAN TESTING DEVICE

Benjamin Shmurak, New York, N. Y., assignor to American Can Company, New York, N. Y., a corporation of New Jersey Application January 15, 1941, Serial No. 375,085

4 Claims. (Cl. 73—51)

The present invention relates to a container or can testing device and has particular reference to testing for the degree of vacuum within a sealed can by vibrating an end of the can.

In the packing of food products and the like in sheet metal cans it is sometimes customary to exhaust the air from the head space in the can to facilitate preservation of the product. This exhausting of the air from the can is usually effected in a vacuumizing chamber, and after such a vacuumizing operation the can is immediately sealed while in the chamber so that the vacuum will be retained.

In consequence of such a vacuumizing and sealing operation it is difficult to accurately know what degree of vacuum exists within a can. In the past, specimen cans in each batch have been selected and tested by puncturing an end of each can and applying a vacuum gage. This procedure of course ruins the tested can for further use.

It is a well known fact that the end members of a sealed sheet metal can have a certain degree of flexibility and that when a vacuum exists within the can its end member will flex inwardly due to the atmospheric pressure exerted thereupon. The flexibility of the can end tends to permit of easy vibration of the end and it has been found that when such a can end is vibrated there is a definite relationship between the amplitude of vibration and the degree of vacuum in the head space of the can. It has also been found that there is a definite frequency at which the amplitude of vibration of each can end is a maximum. This is known as the resonant frequency of the can end. Hence the need of a means for varying the frequency of vibration of the can end.

The instant invention contemplates the use of this principle by setting up exact vibrations in the ends of sealed cans and then testing for the degree of vacuum thereby overcoming the difficulties that have been herebefore experienced in accurately determining this vacuum.

An object of the invention is the provision of a device for testing the degree of vacuum within sealed cans wherein an end of a can is vibrated and the amplitude of such vibrations is measured to accurately determine the degree of vacuum within the can.

Another object is the provision of such a testing device wherein the vibrations are set up in the can end by electric devices and the amplitude of the vibrations are picked up and amplified so that they may be registered for visual inspection.

Another object is the provision of a testing device of this character wherein every sealed can may be tested without injury to the can so that an accurate check may be had on all cans in a batch instead of only specimen test cans as hereinbefore practiced.

Numerous other objects and advantages of the invention will be apparent as it is better understood from the following description, which, taken in connection with the accompanying drawing, discloses a preferred embodiment thereof.

Referring to the drawing:

The single figure is a sectional view of a testing device embodying the instant invention and including a wiring diagram and a schematic showing of the electric apparatus used with the device, the view also showing a commodity filled can in place to be tested, the upper portion of the can being broken away and shown in section.

As a preferred embodiment of the invention the drawing discloses a testing device adapted to determine the degree of vacuum in filled sealed sheet metal cans of the character which comprises a tubular body A having end members B secured thereto in suitable seams C. The cans are preferably filled with contents D. The usual head space, indicated by the letter E, is preferably provided above the contents to permit of vacuumizing the filled can prior to sealing as is customary in the packing art.

The testing device preferably includes an iron-clad electric coil 11 having a central vertically disposed bore 12. The coil surrounds a vertical stem 13 which is disposed in the bore 12. The lower end of the stem projects down below the bottom of the coil. Its upper end extends above the coil and projects up into a vibration pick-up element 15 which may be of the character of the piezo-electric vibration pick-up.

The vibration pick-up element 15 is connected by wires 16 to a voltage amplifier 17. The amplifier in turn is connected by wires 18 to an oscillograph 19.

Electric energy of variable frequency is supplied to the coil 11 from any suitable variable frequency source of such energy as a generator 22. One side of the generator is connected by a wire 23 to the coil. The other side of the generator is connected by a wire 24 to a normally open electric switch 25. The switch is also connected by a wire 26 to the coil.

Hence when the switch 25 is closed the variable frequency electric energy from the source 22 passes through the coil 11. When the end B of a can to be tested is brought into close proximity to the coil with the can end in engagement with the lower end of the stem 13, the variable frequency electric energy passing through the coil sets up a similarly varying magnetic field which in turn sets up mechanical vibration in the can end. The frequency at which the end vibrates is identical with the frequency of the magnetic field and with the frequency of the current passing through the coil.

As hereinbefore stated it has been found that there is a definite relationship between the amplitude of these vibrations and the degree of vacuum in the can.

The relative amplitude of these vibrations is imparted to the stem 13 which engages against the can end and this stem conveys the vibrations to the pick-up element 15. This pick-up element converts the mechanical vibrations into electric vibrations. These pick-up electric vibrations are amplified by the electric amplifier 17 and are thus transmitted to the oscillograph 19.

From the oscillograph the amplitude of the vibrations in the can end may be visually observed and from such observations the degree of vacuum within the can may be readily determined. If desired the oscillograph may be calibrated in inches of vacuum so that the readings may be taken directly therefrom, or the vibration amplitude readings of the ocillograph may be compared with a prepared chart which indicates the degree of vacuum in the can for degrees of amplitude of the registered vibrations.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A device for determining the degree of vacuum within sealed cans, the combination of electrical variable frequency means for setting up mechanical vibrations in a wall of a can at resonant frequencies of said wall for a predetermined range of degrees of vacuum, instrumentalities for picking up said mechanical vibrations, and devices for measuring the amplitude of the vibrations as an index to the degree of vacuum within the can.

2. A device for determining the degree of vacuum within sealed cans, the combination of an electrical coil passing current of frequencies capable of vibrating the end wall of a said can at its resonant frequency for a predetermined range of degrees of vacuum for setting up mechanical vibrations, in said end wall, a freely movable rod within said coil and having one end in engagement with said can end for receiving the mechanical vibrations set up in said can end, a vibrations pick-up element connecting with said rod for picking up said mechanical vibrations and for converting them into electrical vibrations, electrical amplifying means connecting with said pick-up element for amplifying said electrical vibrations, and a measuring device connecting with said amplifying means for measuring and visually indicating the amplitude of said amplified vibrations as an index to the degree of vacuum within the can.

3. A device for determining the degree of vacuum within sealed cans, the combination of an iron clad electric coil adapted to be placed adjacent an end of a can, electrical instrumentalities for passing variable frequency electrical energy through said coil to set up mechanical vibrations in said can end, instrumentalities for picking up said mechanical vibrations and for converting them into electrical vibrations, and devices for measuring the amplitude of said vibrations as an indication of the degree of vacuum within the can.

4. A device for determining the degree of vacuum within sealed cans, the combination of an iron clad electric coil adapted to be placed adjacent an end of a can, electrical instrumentalities for passing variable frequency electrical energy through said coil to set up mechanical vibrations in said can end at resonant frequencies of said end for a predetermined range of degrees of vacuum, instrumentalities for picking up said mechanical vibrations and for converting them into electrical vibrations, and an oscillograph for measuring and visually indicating the amplitude of said electrical vibrations as an index to the degree of vacuum within the can.

BENJAMIN SHMURAK.